United States Patent
Yu et al.

(10) Patent No.: US 8,582,241 B1
(45) Date of Patent: Nov. 12, 2013

(54) METHOD AND SYSTEM FOR PROVIDING A MAGNETIC TRANSDUCER HAVING A HIGH MOMENT BILAYER MAGNETIC SEED LAYER FOR A TRAILING SHIELD

(75) Inventors: Chengtao R. Yu, Mountain House, CA (US); Dehua Han, Fremont, CA (US); Ying Hong, Los Gatos, CA (US); Feng Liu, San Ramon, CA (US); Bo Zhang, Fremont, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/479,095

(22) Filed: May 23, 2012

(51) Int. Cl.
G11B 5/147 (2006.01)

(52) U.S. Cl.
USPC ...................................... 360/125.43; 428/829

(58) Field of Classification Search
USPC ............... 360/119.11, 125.43, 125.56, 235.4; 428/829, 832
See application file for complete search history.

(56) References Cited

U.S. PATENT DOCUMENTS

| | | | |
|---|---|---|---|
| 5,858,548 A * | 1/1999 | Kirino et al. | 428/457 |
| 5,989,690 A * | 11/1999 | Fujikata et al. | 428/811.2 |
| 6,239,948 B1 * | 5/2001 | Wu et al. | 360/125.43 |
| 7,446,980 B2 | 11/2008 | Le | |
| 7,477,481 B2 | 1/2009 | Guthrie et al. | |
| 7,566,508 B2 * | 7/2009 | Thangaraj et al. | 428/832 |
| 7,804,666 B2 | 9/2010 | Guan et al. | |
| 7,821,736 B2 | 10/2010 | Che et al. | |
| 8,018,676 B2 | 9/2011 | Guan | |
| 8,023,231 B2 | 9/2011 | Guan et al. | |
| 8,031,433 B2 | 10/2011 | Yan et al. | |
| 8,118,990 B2 * | 2/2012 | Liu et al. | 205/259 |
| 2006/0199044 A1 * | 9/2006 | Thangaraj et al. | 428/829 |
| 2008/0057281 A1 * | 3/2008 | Kief et al. | 428/216 |
| 2008/0278861 A1 | 11/2008 | Jiang et al. | |
| 2009/0262464 A1 | 10/2009 | Gill et al. | |
| 2011/0063755 A1 | 3/2011 | Bai et al. | |
| 2011/0097601 A1 | 4/2011 | Bai et al. | |
| 2011/0151279 A1 | 6/2011 | Allen et al. | |

* cited by examiner

*Primary Examiner* — Angel Castro

(57) ABSTRACT

A method and system for providing a magnetic read transducer is described. The magnetic recording transducer includes a write pole, a nonmagnetic gap, a magnetic seed layer, a trailing shield and coil(s) that energize the write pole. The write pole is configured to write to a media. The nonmagnetic gap is between the write pole and the magnetic seed layer. The magnetic seed layer includes a high moment layer and a magnetic buffer layer. The high moment layer is between the nonmagnetic gap and the magnetic buffer layer. The high moment layer has a saturation magnetization greater than 2.3 T and a first corrosion potential. The magnetic buffer layer has a second corrosion potential less than the first corrosion potential. The magnetic seed layer is between the trailing shield and the nonmagnetic gap layer. The magnetic buffer layer is between the trailing shield and the high moment layer.

27 Claims, 5 Drawing Sheets

METHOD AND SYSTEM FOR PROVIDING A MAGNETIC TRANSDUCER HAVING A HIGH MOMENT BILAYER MAGNETIC SEED LAYER FOR A TRAILING SHIELD

BACKGROUND

FIG. 1 depicts a portion of a conventional magnetic transducer 10, such as a conventional write transducer, as viewed from the air-bearing surface (ABS). The conventional transducer 10 includes a nonmagnetic underlayer 12 that may reside on a bottom shield, a conventional write pole 14, a conventional write gap 16, a conventional NiCr seed layer 18 a conventional magnetic seed layer 20, and a conventional trailing shield 22. The conventional write gap 16 is nonmagnetic, as is the conventional NiCr seed layer 18. The conventional magnetic seed layer 20 typically consists of $Co_{40}Ni_5Fe_{55}$. The conventional trailing shield typically has a high permeability and a high saturation magnetization.

Although the conventional magnetic recording transducer 10 functions, there are drawbacks particularly as the conventional transducer 10 is desired to be scaled to higher recording densities. For example, the conventional trailing shield 22 is also scaled to smaller dimensions. The tip of the conventional trailing shield 22 is the portion of the conventional trailing shield 22 at the ABS. This portion of the conventional trailing shield 22 is depicted in FIG. 1. At high densities, the conventional trailing shield tip 22 is desired to have a small throat height, or depth perpendicular to the plane of the page in FIG. 1. For example, the throat height may be on the order of 60-80 nm or less. At such small throat heights, the conventional trailing shield 22 may saturate during operation of the transducer. The conventional trailing shield may, therefore, be unable to adequately shield the pole 14 from the media and vice versa. At higher densities, the track width, TW, of the conventional pole 14 also decreases. At such higher densities, the gradient in the magnetic field from the write pole 14 may be lower than is desired. Thus, a disk drive using the conventional transducer 10 may be subject to error.

Accordingly, what is needed is a system and method for providing a write transducer having improved performance at higher densities.

BRIEF SUMMARY OF THE INVENTION

A method and system for providing a magnetic read transducer is described. The magnetic recording transducer includes a write pole, a nonmagnetic gap, a magnetic seed layer, a trailing shield and coil(s) that energize the write pole. The write pole is configured to write to a media. The nonmagnetic gap is between the write pole and the magnetic seed layer. The magnetic seed layer includes a high moment layer and a magnetic buffer layer. The high moment layer is between the nonmagnetic gap and the magnetic buffer layer. The high moment layer has a saturation magnetization greater than 2.3 T and a first corrosion potential. The magnetic buffer layer has a second corrosion potential less than the first corrosion potential. The magnetic seed layer is between the trailing shield and the nonmagnetic gap layer. The magnetic buffer layer is between the trailing shield and the high moment layer.

DETAILED DESCRIPTION OF THE PREFERRED EMBODIMENTS

Figure 1:
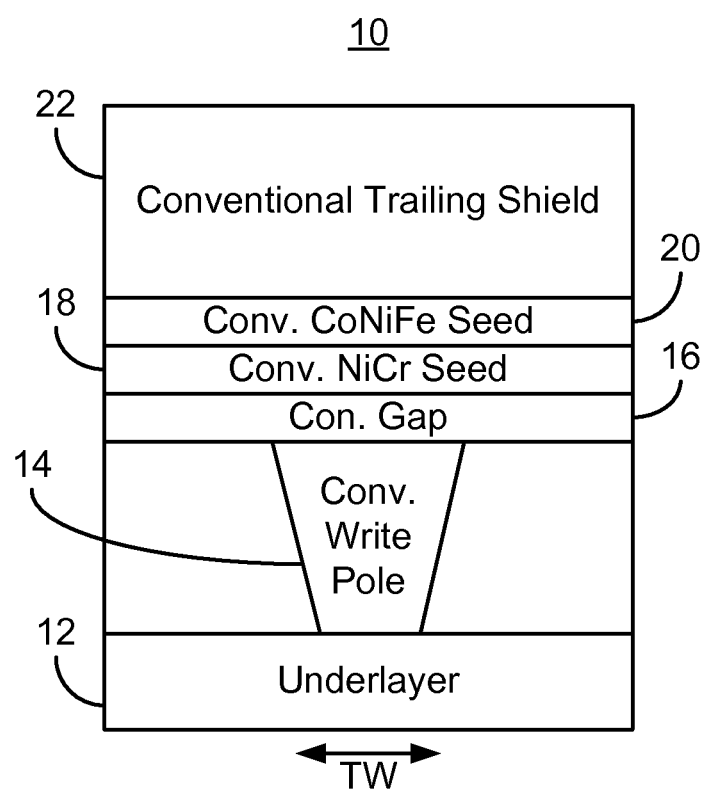
FIG. 1 is a diagram depicting an ABS view of a portion of a conventional transducer including a conventional sensor.
Figure 2:
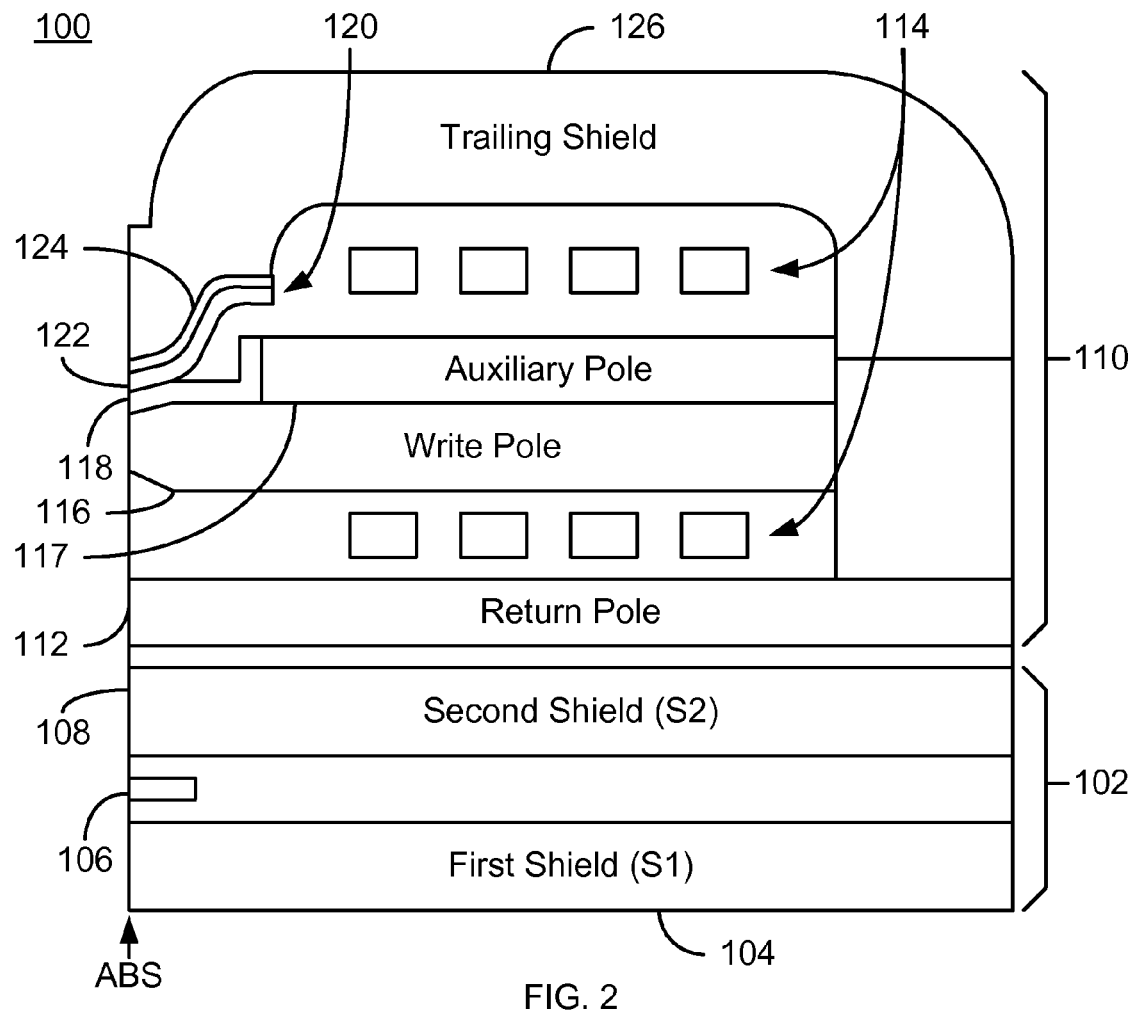
FIG. 2 depicts a side view an exemplary embodiment of a head including an exemplary embodiment of a transducer.
Figure 3:
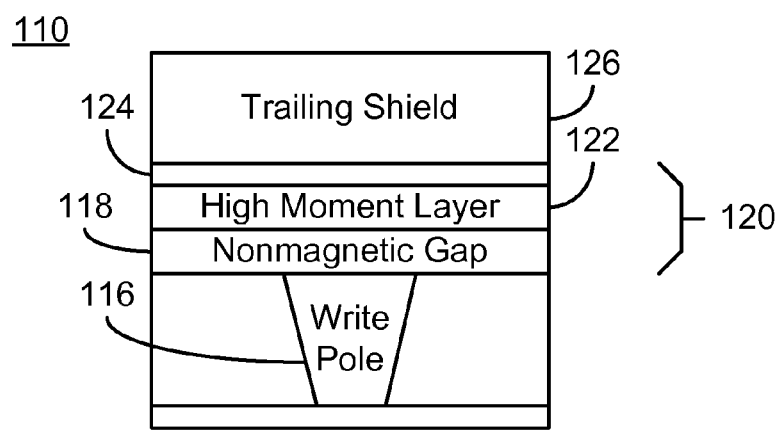
FIG. 3 depicts an ABS view an exemplary embodiment of a portion of a head including an exemplary embodiment of a transducer.

FIGS. 2-3 depict a magnetic head 100. A side view of the head is depicted in FIG. 2, while an ABS view of a portion of the head is shown in FIG. 3. FIGS. 2 and 3 are not to scale and not all components of the magnetic head 100 are shown. The magnetic head 100 is a merged head that includes a magnetic write transducer 110 and a magnetic read transducer 102. In other embodiments, the read transducer 102 and write transducer 110 may also be in separate heads. The magnetic head 100 resides on a slider and is typically one of many magnetic heads in a disk drive and used to write to and read from a media (not shown).

The read transducer 102 includes shields 104 and 108 as well as sensor 106. The sensor 106 may be used to read data from a media (not shown). The shields 104 and 108 may be a soft magnetic material, such as NiFe. The shields 104 and 108 magnetically isolate the sensor 106 from bits not being read during operation of the transducer 102. The sensor 106 is sensitive to a magnetic field from the media. For example, the sensor 106 may be a giant magnetoresistance or tunneling magnetoresistance sensor. Although shown as electrically isolated from the shields 104 and 108, in other embodiments, the sensor 106 may be electrically coupled with the shield 104 and/or the shield 108. Further, in other embodiments, the arrangement of components in the read transducer 1110 may differ.

In some embodiments, the write transducer 110 is a perpendicular magnetic recording (PMR) transducer. However, in other embodiments, the transducer 110 may be an energy assisted magnetic recording (EAMR) transducer. In other embodiments, the write transducer 110 may be another type of writer. The write transducer 110 includes an optional return pole 112, auxiliary pole 117, main/write pole 116, coils 114, write gap 118, trailing shield seed layer 120 and trailing shield 126. In another embodiment, the write transducer 110 includes other and/or different components. In addition, one or more portions of the write transducer 110 might be omitted in various embodiments. The arrangement of the components of the write transducer 110 may differ in other embodiments.

The write pole 116 has a pole tip in proximity to the ABS and is used to write to the media (not shown in FIGS. 2-3). Current driven through the coils 114 is used to energize the write pole 116. The trailing shield 126 may be used to magnetically shield bits not being written from the write field generated by the write pole 116. The trailing shield 126 may have a high permeability and a high saturation magnetization. For example, the trailing shield 126 may have a saturation magnetization on the order of 2.0 T or higher. In some embodiments, the trailing shield 126 is plated. However, in other embodiments, the trailing shield 126 may be deposited using other and/or additional process(es).

The trailing shield seed layer 120 resides on the nonmagnetic gap layer 118. In the embodiment shown, the trailing shield seed layer 120 resides directly on the nonmagnetic gap 18. However, in other embodiments, another layer (not shown) may reside between the trailing shield seed layer 120 and the nonmagnetic gap 118. The trailing shield seed layer 120 may be deposited via sputtering. However, in other embodiments, another process may be used. The trailing shield seed layer 120 is a multilayer magnetic seed layer. The magnetic trailing shield seed layer 120 includes a high moment layer 122 and a magnetic buffer layer 124.

The high moment layer 120 is between the magnetic buffer layer 124 and the nonmagnetic gap layer 118. The high moment layer 122 has a saturation magnetization of greater than 2.3 T. In some such embodiments, the saturation magnetization of the high moment layer 122 may be at least 2.4 T. The saturation magnetization of the high moment layer 122 may be selected to match the saturation magnetization of the write pole 116. In addition, the high moment layer has a first corrosion potential. A corrosion potential relates to the likelihood that a particular layer will corrode upon exposure to air. The higher the corrosion potential for a particular layer, the more likely the layer is to corrode. The high moment layer may include $Co_xFe_{1-x}$, where x is at least 0.27 and not more than 0.35. In some embodiments, the high moment layer may include a CoNiFe alloy, such as $Co_{40}Ni_5Fe_{55}$.

The magnetic buffer layer 124 is between the high moment layer 122 and the trailing shield 126. The magnetic buffer layer 124 may be configured such that at least some of the properties of the magnetic buffer layer 124 are between those of the high moment layer 122 and the trailing shield 126. In some embodiments, the magnetic buffer layer 124 has a lower saturation magnetization than the high moment layer 122. In such embodiments, the saturation magnetization of the magnetic buffer layer 124 may be at least equal to the saturation magnetization of the trailing shield 126. For example, the trailing shield 126 may have a saturation magnetization of 2.0 T or greater. In some such embodiments, the magnetic buffer layer 124 includes $Ni_xFe_{1-x}$, where x is at least 0.1 and not more than 0.2. In other embodiments, the magnetic buffer layer 124 may include CoNiFe. Such a layer may have a saturation magnetization of at least 2.0 T, but that may also be lower than 2.3-2.4 T. In other embodiments, the saturation magnetization of the magnetic buffer layer 124 may be substantially the same as that of the high moment layer 122. The magnetic buffer layer 124 may be selected to have substantially the same saturation magnetization as the trailing shield 126. In some embodiments, therefore, the high moment layer 122 may be selected to more closely match the properties of the write pole 116, while the magnetic buffer layer 124 may be selected to have magnetic properties that are between those of the trailing shield 126 and the high moment layer 124.

Similarly, crystallographic properties of the magnetic buffer layer 124 may more closely match those of the trailing shield 126 than the high moment layer 122. For example, suppose the trailing shield 126 has a trailing shield texture, the magnetic buffer layer 124 has a buffer layer texture, and the high moment layer 122 has a high moment layer texture. The buffer layer texture of the magnetic buffer layer 124 may be closer to the trailing shield texture than the high moment layer texture is. Thus, magnetic, crystallographic, and/or other properties of the magnetic buffer layer 124 may be intermediary between those of the high moment layer 122 and the trailing shield 126.

The magnetic buffer layer 124 also has a second corrosion potential. This second corrosion potential of the magnetic buffer layer 124 is less than the first corrosion potential of the high moment layer 122. Thus, the magnetic buffer layer 124 may be considered to be less likely to corrode upon exposure to air than the high moment layer 122. As can be seen in the embodiment shown in FIGS. 2-3, in some embodiments, the magnetic buffer layer 124 is thinner than the high moment layer 122. For example, the high moment layer 122 may be at least twice as thick as the magnetic buffer layer 124. In some such embodiments, the high moment layer 122 is at least 2.5 times as thick as the magnetic buffer layer 124. The sum of the thicknesses of the layers 122 and 124 may also be set. For example, the magnetic seed layer 120 may have a thickness of at least four hundred Angstroms and not more than one thousand Angstroms. Thus, the thicknesses of the layers 122 and 124 may be set by the total desired thickness of the magnetic seed layer 120 and the desired relationship between the thicknesses of the layers 122 and 124.

Using the trailing shield magnetic seed layer 120, performance of the transducer 110 may be improved. Because it is magnetic, the magnetic seed layer 120 may be considered to be magnetically part of the trailing shield 126. The magnetic seed layer 120 improves the saturation properties of the trailing shield 126. More specifically, the tip of the trailing shield 126 may be less likely to saturate. The magnetic seed layer 120 described herein may also allow the trailing shield 126 to have a lower easy axis coercivity, a lower hard axis coercivity, and/or a higher anisotropy than the conventional trailing shield 22. This may translate to a reduced magnetic dispersion and improved in-plane alignment. Thus, the off track field may be improved. Because of the presence of the magnetic buffer layer 120, the saturation magnetizations of the seed layer 120 near the trailing shield 126 better matches the saturation magnetization of the trailing shield 126. This matching occurs even though the high moment layer 122 is present. As a result, there may be an improved gradient in the field at the ABS near the trailing shield tip. Such an improvement in field gradient may also improve performance of the magnetic write transducer 110. In addition, the corrosion potential of the magnetic buffer layer 124 is less than that of the high moment layer 122. Consequently, the magnetic transducer 110 may be more resistant to corrosion. Thus, reliability and performance of the magnetic transducer 110 may be improved.

Figure 4:
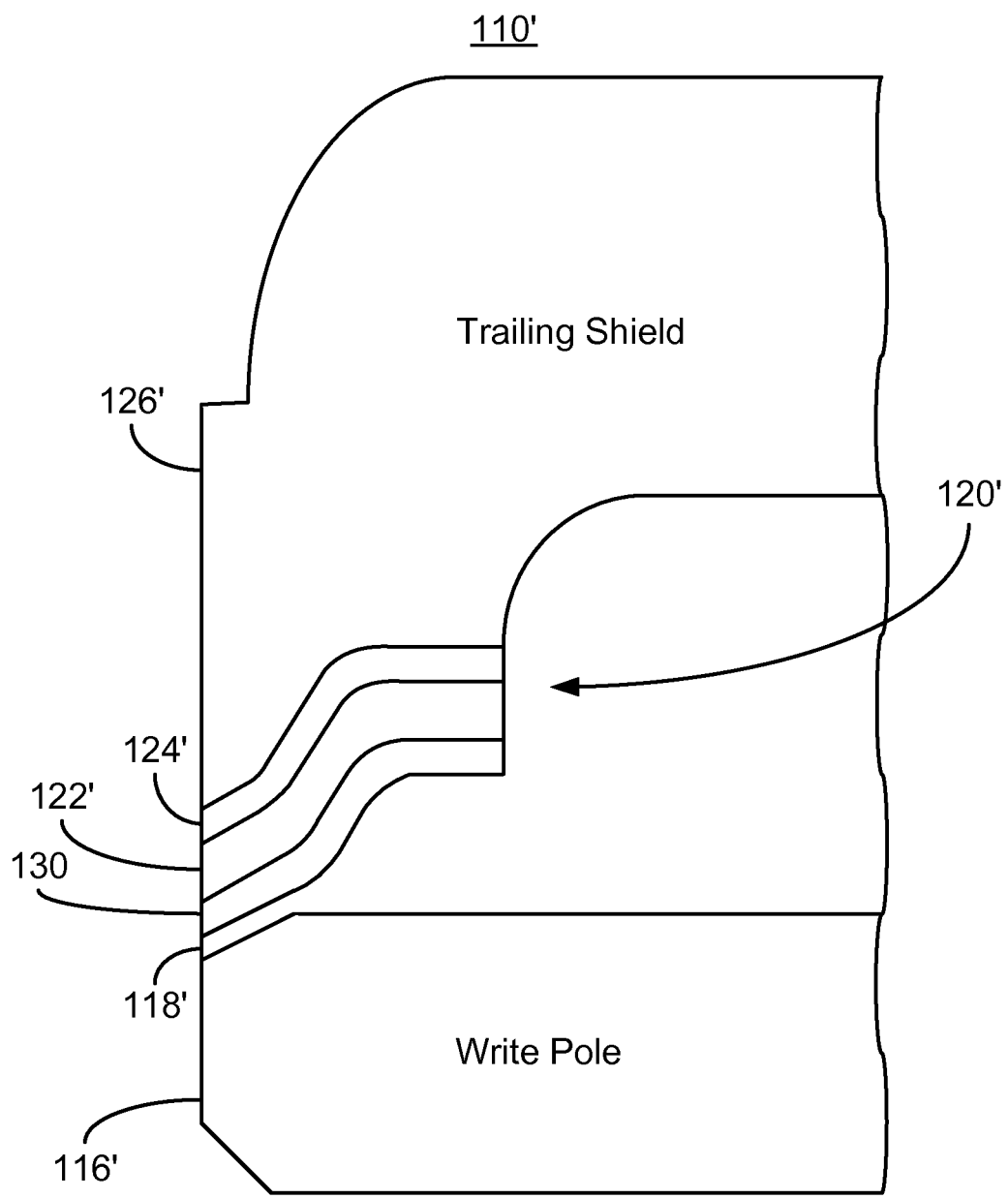
FIG. 4 depicts a side view of a portion of another exemplary embodiment of a write transducer.

FIG. 4 depicts another exemplary embodiment of a portion of the write transducer 110' including a magnetic seed layer 120'. For clarity, FIG. 4 is not to scale. The transducer 110' is also described in the context of particular layers. However, in some embodiments, such layers may include sub-layer(s). Portions of the transducer 110' are analogous to those of the head 100 and transducer 110 shown in FIGS. 2-3. Such analogous structures are labeled similarly. The transducer 110' thus includes a write pole 116', nonmagnetic gap 118', magnetic seed layer 120', and trailing shield 126' that are analogous to the write pole 116, nonmagnetic gap 118, magnetic seed layer 120, and trailing shield 126, respectively. The magnetic seed layer 120' includes a high moment layer 122' and a magnetic buffer layer 124' that are analogous to the high moment layer 122 and the magnetic buffer layer 124, respectively. The high moment layer 122' has a high saturation magnetization of at least 2.3 T-2.4 T or higher. The high moment layer 122' may include $Co_xFe_{1-x}$, where x is at least 0.27 and not more than 0.35. In some embodiments, the high moment layer may include a CoNiFe alloy, such as $Co_{40}Ni_5Fe_{55}$. In some such embodiments, the magnetic buffer layer 124' includes $Ni_xFe_{1-x}$, where x is at least 0.1 and not more than 0.2. In other embodiments, the magnetic buffer layer 124' may include CoNiFe. The magnetic buffer layer 122' may have a saturation magnetization, crystallographic texture, and/or other properties between those of the high moment layer 122' and the trailing shield 126'. The magnetic buffer layer 124' may also have a lower corrosion potential than the high moment layer 122'.

The write transducer 110' also includes a nonmagnetic seed layer 130. The nonmagnetic seed layer 130 resides between the nonmagnetic write gap 118' and the magnetic seed layer 120'. In some embodiments, the nonmagnetic seed layer 130 includes $Ni_xCr_{1-x}$, where x is at least 0.75 and not more than 0.85.

Using the trailing shield magnetic seed layer 120', performance of the transducer 110' may be improved. In particular, the saturation of the tip of the trailing shield 126', the resistance to corrosion, and field gradient may be improved. Thus, reliability and performance of the magnetic transducer 110' may be improved.

Figure 5:
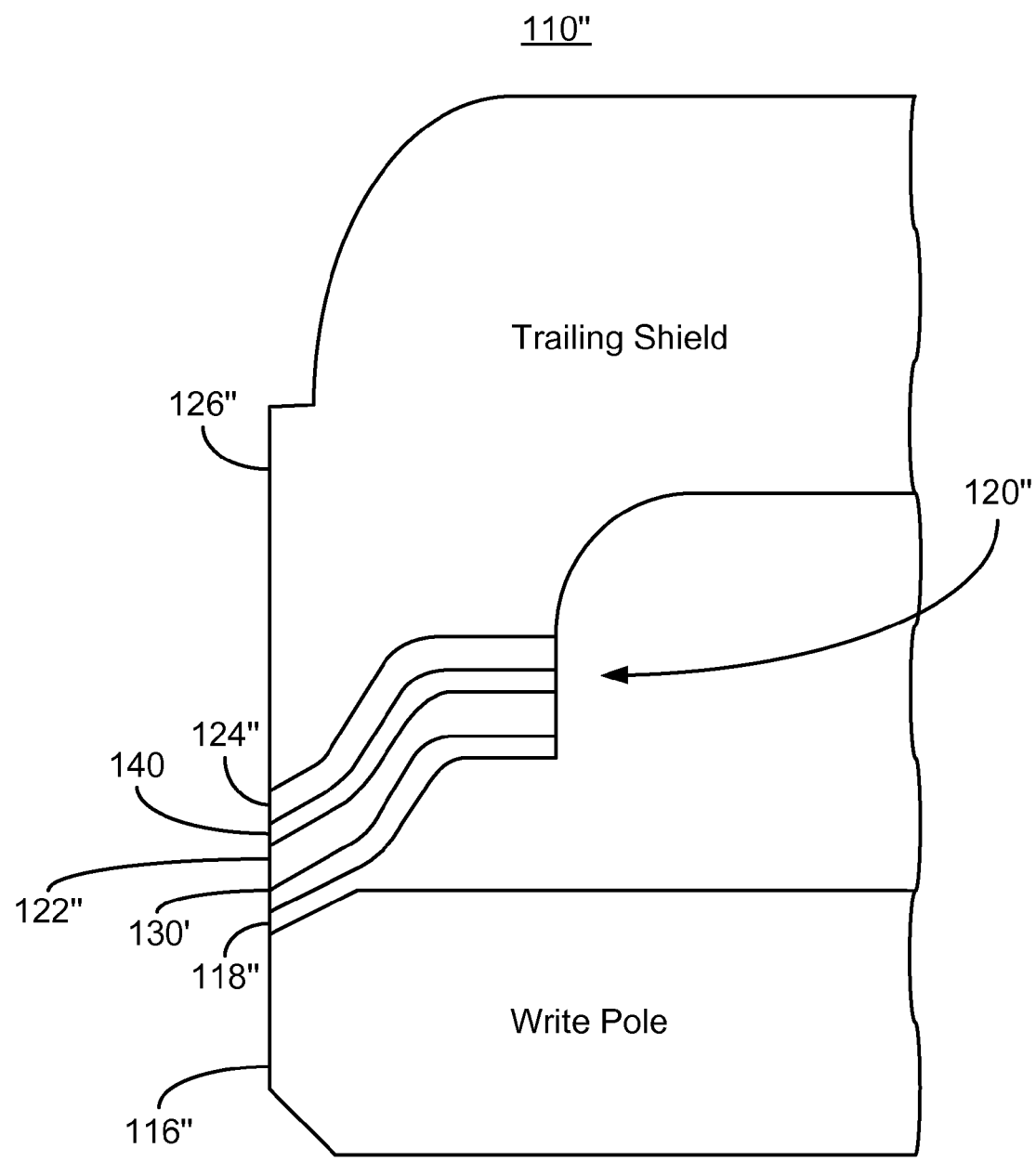
FIG. 5 depicts a side view of a portion of another exemplary embodiment of a write transducer.

FIG. 5 depicts another exemplary embodiment of a portion of the write transducer 110" including a magnetic seed layer 120". For clarity, FIG. 5 is not to scale. The transducer 110" is also described in the context of particular layers. However, in some embodiments, such layers may include sub-layer(s). Portions of the transducer 110" are analogous to those of the head 100 and transducers 110 and 11' shown in FIGS. 2-4. Such analogous structures are labeled similarly. The transducer 110" thus includes a write pole 116", nonmagnetic gap 118", nonmagnetic seed layer 130", magnetic seed layer 120", and trailing shield 126" that are analogous to the write pole 116/116', nonmagnetic gap 118/118', nonmagnetic seed layer 130, magnetic seed layer 120/120', and trailing shield 126/126', respectively. The magnetic seed layer 120" includes a high moment layer 122" and a magnetic buffer layer 124" that are analogous to the high moment layer 122/122' and the magnetic buffer layer 124/124', respectively. The high moment layer 122" has a high saturation magnetization of at least 2.3 T-2.4 T or greater. The high moment layer 122" may include $Co_xFe_{1-x}$, where x is at least 0.27 and not more than 0.35. In some embodiments, the high moment layer 122" may include a CoNiFe alloy, such as $Co_{40}Ni_5Fe_{55}$. In some such embodiments, the magnetic buffer layer 124" includes $Ni_xFe_{1-x}$, where x is at least 0.1 and not more than 0.2. In other embodiments, the magnetic buffer layer 124" may include CoNiFe. The magnetic buffer layer 122" may have a saturation magnetization, crystallographic texture, and/or other properties between those of the high moment layer 122" and the trailing shield 126". The magnetic buffer layer 124" may also have a lower corrosion potential than the high moment layer 122". In some embodiments, the nonmagnetic seed layer 130' includes $Ni_xCr_{1-x}$, where x is at least 0.75 and not more than 0.85. In the embodiment shown, the magnetic seed layer 120" has an additional layer 140. The additional layer 140 may have properties between those of the magnetic buffer layer 124" and the high moment layer 122". For example, the corrosion potential, saturation magnetization, and crystallographic texture may be between that of the magnetic buffer layer 124" and the high moment layer 122".

Using the trailing shield magnetic seed layer 120", performance of the transducer 110" may be improved. In particular, the saturation of the tip of the trailing shield 126", the resistance to corrosion, and field gradient may be improved. Thus, reliability and performance of the magnetic transducer 110" may be improved.

Figure 6:
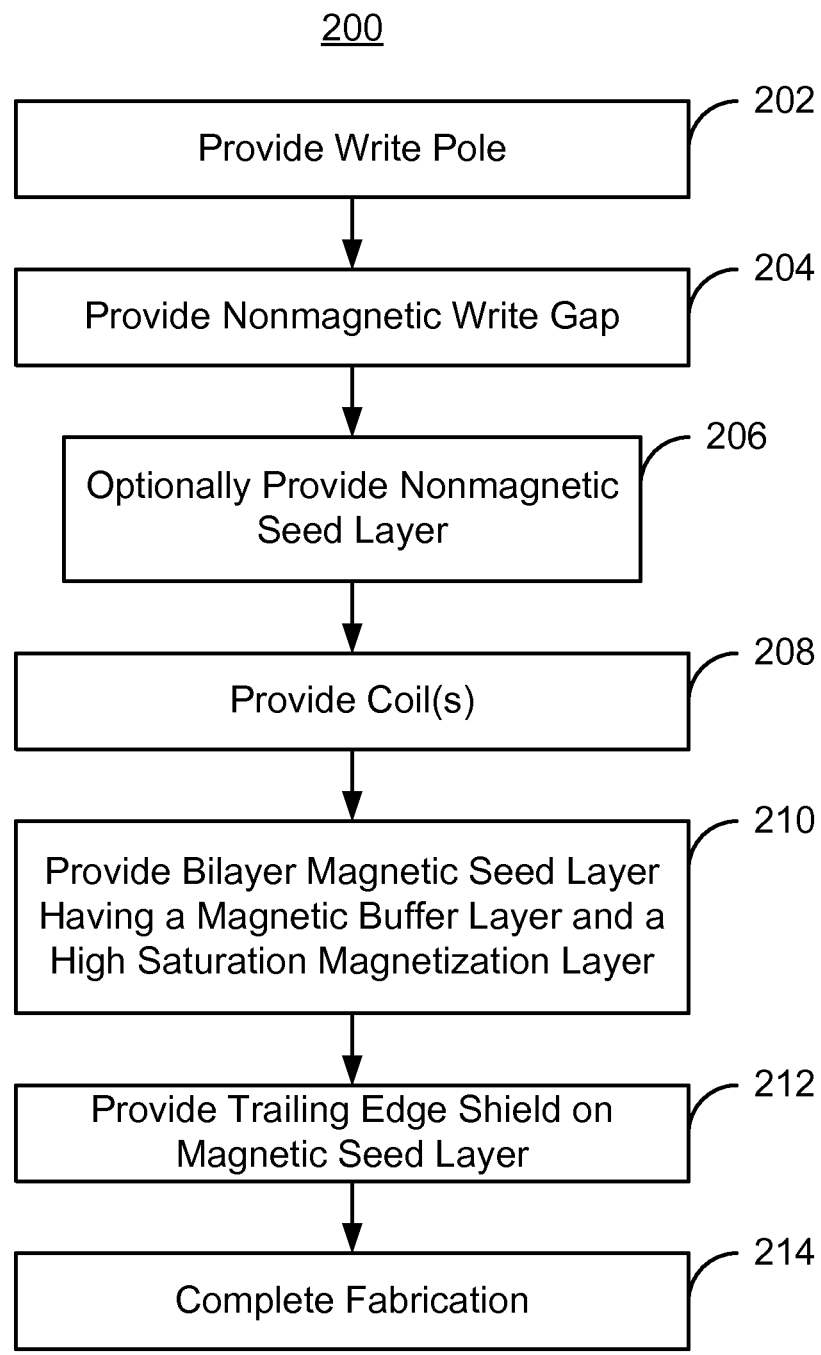
FIG. 6 depicts an exemplary embodiment of a method of forming an exemplary embodiment of a write transducer.

FIG. 6 depicts an exemplary embodiment of a method 200 of forming an exemplary embodiment of a write transducer including a magnetic seed layer having at least two layers. For simplicity, some steps may be omitted, combined, and/or interleaved. The method 200 is described in the context of the transducer 110'. However, the method 200 may be used for other transducers including but not limited to the transducers 110 and 110". The method 200 also may commence after formation of other structures of the read and/or write transducer. The method 200 is also described in the context of providing a single transducer 110'. However, the method 200 may be used to fabricate multiple structures at substantially the same time. The method 200 and structures such as the transducers 110/110'/110" are also described in the context of particular layers. However, in some embodiments, such layers may include sub-layer(s).

The write pole 116" is provided, via step 202. In some embodiments, the write pole 116" is plated. In other embodiments, write pole 116" is deposited in another manner and/or on another structure. Step 202 may include depositing a single material such as an alloy or a multilayer. The nonmagnetic write gap 118" is provided on at least the portion of the write pole 116" proximate to the ABS, via step 204. The nonmagnetic seed layer 130 is optionally provided, via step 206. In some embodiments, step 206 includes depositing a layer of $Ni_xCr_{1-x}$, where x is at least 0.75 and not more than 0.85. The coil(s) 114 are also provided, via step 208.

The magnetic seed layer 120' is provided, via step 210. Step 210 includes depositing the high moment layer 122' and the magnetic buffer layer 124'. In some embodiments, the layers 122' and/or 124' are sputtered. However, in other embodiments, the layers 122' and/or 124' may be deposited in another manner. In some embodiments, step 210 may also include depositing optional layer 140. The high moment layer 122' and magnetic buffer layer 124' have the properties described above. For example, the high moment layer 122' has a saturation magnetization of at least 2.3 T. In some embodiments, the high moment layer saturation magnetization is at least 2.4 T. The magnetic buffer layer 124' may have a saturation magnetization that is greater than or equal to that of the trailing shield 126' and not more than that of the high moment layer 122'. In addition, the texture of the magnetic buffer layer 124' may be between that of the trailing shield 126' and that of the high moment layer 122'. The magnetic buffer layer 124' may also have a lower corrosion potential than the high moment layer 122'. Step 210 also includes providing the magnetic buffer layer 124' and the high moment layer 122' at the desired thicknesses, described above. The magnetic seed layer 120' provided in step 210 may have a thickness of at least four hundred Angstroms and not more than one thousand Angstroms.

The trailing shield 126' is provided on the magnetic seed layer 120', via step 212. Fabrication of the transducer 110', and/or the head 100 may be completed, via step 214.

Using the method 200 fabrication of the transducers 110, 110', and/or 110", as well as head 100 may be completed. Thus, the benefits of the transducers 110, 110', and/or 110" may be achieved.

We claim:

1. A magnetic recording transducer having an air-bearing surface (ABS) and comprising:
   a write pole configured to write to a media;
   a nonmagnetic gap;
   a magnetic seed layer including a high moment layer and a magnetic buffer layer, the high moment layer being between the nonmagnetic gap and the magnetic buffer layer, the nonmagnetic gap being between the magnetic seed layer and the write pole, the high moment layer having a saturation magnetization greater than 2.3 T and a first corrosion potential, the magnetic buffer layer having a second corrosion potential less than the first corrosion potential;
   a trailing shield, the magnetic seed layer being between the trailing shield and the nonmagnetic gap layer, the magnetic buffer layer being between the trailing shield and the high moment layer; and at least one coil for energizing the write pole.

2. The magnetic recording transducer of claim 1 wherein the saturation magnetization is at least 2.4 T.

3. The magnetic recording of claim 1 wherein the high moment layer further includes $Co_xFe_{1-x}$, where x is at least 0.27 and not more than 0.35.

4. The magnetic recording transducer of claim 1 wherein the magnetic buffer layer has a saturation magnetization of at least 2.0 T.

5. The magnetic recording transducer of claim 1 wherein the magnetic buffer layer includes $Ni_xFe_{1-x}$, where x is at least 0.1 and not more than 0.2.

6. The magnetic recording transducer of claim 1 wherein the high moment layer has a first thickness, the magnetic buffer layer has a second thickness and the ratio of the first thickness divided by the second thickness is at least 2.

7. The magnetic recording transducer of claim 6 wherein the ratio is at least 2.5.

8. The magnetic recording transducer of claim 6 wherein the magnetic seed layer has a total thickness of at least four hundred Angstroms and not more than one thousand Angstroms.

9. The magnetic recording transducer of claim 1 wherein the trailing shield has a trailing shield saturation magnetization and the magnetic buffer layer has a buffer layer saturation magnetization, the buffer layer saturation magnetization being at least equal to the trailing shield saturation magnetization and less than the saturation magnetization of the high moment layer.

10. The magnetic recording transducer of claim 1 wherein the trailing shield has a trailing shield texture, the magnetic buffer layer has a buffer layer texture, and the high moment layer has a high moment layer texture, the buffer layer texture being closer to the trailing shield texture than the high moment layer texture.

11. The magnetic recording transducer of claim 1 wherein the magnetic seed layer is a sputtered magnetic seed layer and the trailing shield is a plated trailing shield.

12. The magnetic recording transducer of claim 1 further comprising:

a nonmagnetic seed layer between the magnetic seed layer and the nonmagnetic gap.

13. The magnetic recording transducer of claim 12 wherein the nonmagnetic seed layer includes $Ni_xCr_{1-x}$, where x is at least 0.75 and not more than 0.85.

14. A magnetic recording disk drive comprising:

a media;

a slider;

a magnetic transducer coupled with the slider and having an air-bearing surface (ABS) configured to reside in proximity to the media during operation, the magnetic transducer including a write pole, a nonmagnetic gap, a magnetic seed layer, a trailing shield, and at least one coil, the write pole configured to write to the media, the magnetic seed layer including a high moment layer and a magnetic buffer layer, the high moment layer being between the nonmagnetic gap and the magnetic buffer layer, the nonmagnetic gap being between the magnetic seed layer and the write pole, the high moment layer having a saturation magnetization greater than 2.3 T and a first corrosion potential, the magnetic buffer layer having a second corrosion potential less than the first corrosion potential, the magnetic seed layer being between the trailing shield and the nonmagnetic gap layer, the magnetic buffer layer being between the trailing shield and the high moment layer, the at least one coil for energizing the write pole.

15. A method for fabricating magnetic recording transducer having an air-bearing surface (ABS), the method comprising:

providing a write pole configured to write to a media;

providing a nonmagnetic gap;

providing a magnetic seed layer including a high moment layer and a magnetic buffer layer, the high moment layer being between the nonmagnetic gap and the magnetic buffer layer, the nonmagnetic gap being between the magnetic seed layer and the write pole, the high moment layer having a saturation magnetization greater than 2.3 T and a first corrosion potential, the magnetic buffer layer having a second corrosion potential less than the first corrosion potential;

providing a trailing shield, the magnetic seed layer being between the trailing shield and the nonmagnetic gap layer, the magnetic buffer layer being between the trailing shield and the high moment layer; and providing at least one coil for energizing the write pole.

16. The method of claim 15 wherein the saturation magnetization is at least 2.4 T.

17. The method of claim 15 wherein the high moment layer further includes $Co_xFe_{1-x}$, where x is at least 0.27 and not more than 0.35.

18. The method of claim 15 wherein the magnetic buffer layer has a saturation magnetization of at least 2.0 T.

19. The method of claim 15 wherein the magnetic buffer layer includes $Ni_xFe_{1-x}$, where x is at least 0.1 and not more than 0.2.

20. The method of claim 15 wherein the high moment layer has a first thickness, the magnetic buffer layer has a second thickness and the ratio of the first thickness divided by the second thickness is at least 2.

21. The method of claim 20 wherein the ratio is at least 2.5.

22. The method of claim 20 wherein the magnetic seed layer has a total thickness of at least four hundred Angstroms and not more than one thousand Angstroms.

23. The method of claim 15 wherein the trailing shield has a trailing shield saturation magnetization and the magnetic buffer layer has a buffer layer saturation magnetization, the buffer layer saturation magnetization being at least equal to the trailing shield saturation magnetization and less than the saturation magnetization of the high moment layer.

24. The method of claim 15 wherein the trailing shield has a trailing shield texture, the magnetic buffer layer has a buffer layer texture, and the high moment layer has a high moment layer texture, the buffer layer texture being closer to the trailing shield texture than the high moment layer texture.

25. The method of claim 15 wherein the magnetic seed layer is a sputtered magnetic seed layer and the trailing shield is a plated trailing shield.

26. The method of claim 15 further comprising:

providing a nonmagnetic seed layer between the magnetic seed layer and the nonmagnetic gap.

27. The method of claim 26 wherein the nonmagnetic seed layer includes $Ni_xCr_{1-x}$, where x is at least 0.75 and not more than 0.85.

* * * * *